(12) United States Patent
Adaniya et al.

(10) Patent No.: US 8,405,274 B2
(45) Date of Patent: Mar. 26, 2013

(54) MOTOR STATOR AND PHASE COIL PREFORM

(75) Inventors: Taku Adaniya, Aichi-ken (JP); Shinichi Okuyama, Aichi-ken (JP); Hiroshi Fukasaku, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 148 days.

(21) Appl. No.: 13/033,207

(22) Filed: Feb. 23, 2011

(65) Prior Publication Data

US 2011/0210639 A1 Sep. 1, 2011

(30) Foreign Application Priority Data

Feb. 26, 2010 (JP) ................................ 2010-042835

(51) Int. Cl.
*H02K 3/04* (2006.01)
(52) U.S. Cl. .................... 310/207; 310/203; 310/208
(58) Field of Classification Search .......... 310/201–208, 310/179, 184
See application file for complete search history.

(56) References Cited

U.S. PATENT DOCUMENTS

| | | | | |
|---|---|---|---|---|
| 3,705,459 A | * | 12/1972 | Biddison | 29/597 |
| 5,072,129 A | * | 12/1991 | Sugiyama | 290/48 |
| 6,515,393 B2 | * | 2/2003 | Asao et al. | 310/184 |
| 6,809,437 B2 | * | 10/2004 | Oohashi et al. | 310/45 |
| 6,825,589 B2 | * | 11/2004 | Kouda et al. | 310/207 |
| 6,960,857 B2 | * | 11/2005 | Oohashi et al. | 310/179 |
| 7,155,805 B2 | * | 1/2007 | Nakamura | 29/596 |
| 7,246,428 B2 | * | 7/2007 | Fukasaku et al. | 29/605 |
| 8,181,332 B2 | * | 5/2012 | Chochoy | 29/596 |
| 2002/0063490 A1 | * | 5/2002 | Asao et al. | 310/207 |

FOREIGN PATENT DOCUMENTS

| | | |
|---|---|---|
| CN | 101595623 A | 12/2009 |
| JP | 07-163074 A | 6/1995 |
| JP | 2009-033831 A | 2/2009 |
| JP | 2009-033832 A | 2/2009 |
| JP | 2009-247196 A | 10/2009 |

OTHER PUBLICATIONS

Chinese Office Action for corresponding CN Patent Application No. 201110049156.5 issued on Nov. 27, 2012.

* cited by examiner

*Primary Examiner* — Thanh Lam
(74) *Attorney, Agent, or Firm* — Sughrue Mion, PLLC

(57) ABSTRACT

A stator of a motor includes a stator core having a plurality of teeth forming slots between any two adjacent teeth and a plurality of phase coils provided in the slots, each formed by wave winding and made of a continuous wire. Each phase coil includes a first wave winding bundle and a second wave winding bundle that is passed through a first slot and a second slot. The first slot is located adjacent to one side of a group of slots through which the phase coils other than said each phase coil are passed and the second slot is located adjacent to the other side of the group of slots. The first wave winding bundle is passed through a third slot and a fourth slot. The third slot is located adjacent to the first slot on the opposite side of the first slot from the group of slots and the fourth slot is located adjacent to the second slot on the opposite side of the second slot from the group of slots.

10 Claims, 7 Drawing Sheets

MOTOR STATOR AND PHASE COIL PREFORM

BACKGROUND OF THE INVENTION

The present invention relates to a motor stator and a phase coil preform used for a motor stator and, more specifically, to a stator core of the motor stator having a plurality of teeth forming slots between any two adjacent teeth and plural phase coil formed by wave winding and provided in the slots.

In a motor, torque pulsation per rotation of a motor rotor is generated at the least common multiple of the respective numbers of the slots for coils and the poles of the motor. The larger the number of torque pulsations per rotation is, the smaller the amplitude of the torque pulsation is. Therefore, an increased number of slots is desired as disclosed in Japanese Application Publication 2009-33832.

Coils for the motor stator disclosed in the above Publication are formed by wave winding. Each phase coil, namely an U-phase coil, a V-phase coil or a W-phase coil is divided into two groups of coil. One group of slots through which first wave winding bundle of each phase coil is wound is separated from the other group of slots through which second wave winding bundle of the phase coil is wound. This arrangement is employed for increasing the number of slots. The number of slots in the case in which each phase coil is divided into two groups is twice as many as that in which each phase coil is not divided into two groups.

In providing the respective phase coils in the slots of the motor stator according to the above Publication, the two groups of each phase coil are passed through the slots independently and then connected each other by a connection wire. However, such connecting operation is time-consuming and laborious and furthermore the connections should be insulated appropriately by covering with insulating material.

The present invention is directed to providing a motor stator and a phase coil preform that dispense with the operation of connecting electrically a first wave winding bundle and a second wave winding bundle in fabrication process.

SUMMARY OF THE INVENTION

A stator of a motor includes a stator core having a plurality of teeth forming slots between any two adjacent teeth and a plurality of phase coils provided in the slots, each formed by wave winding and made of a continuous wire. Each phase coil includes a first wave winding bundle and a second wave winding bundle that is passed through a first slot and a second slot. The first slot is located adjacent to one side of a group of slots through which the phase coils other than said each phase coil are passed and the second slot is located adjacent to the other side of the group of slots. The first wave winding bundle is passed through a third slot and a fourth slot. The third slot is located adjacent to the first slot on the opposite side of the first slot from the group of slots and the fourth slot is located adjacent to the second slot on the opposite side of the second slot from the group of slots.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENT

Figure 1:
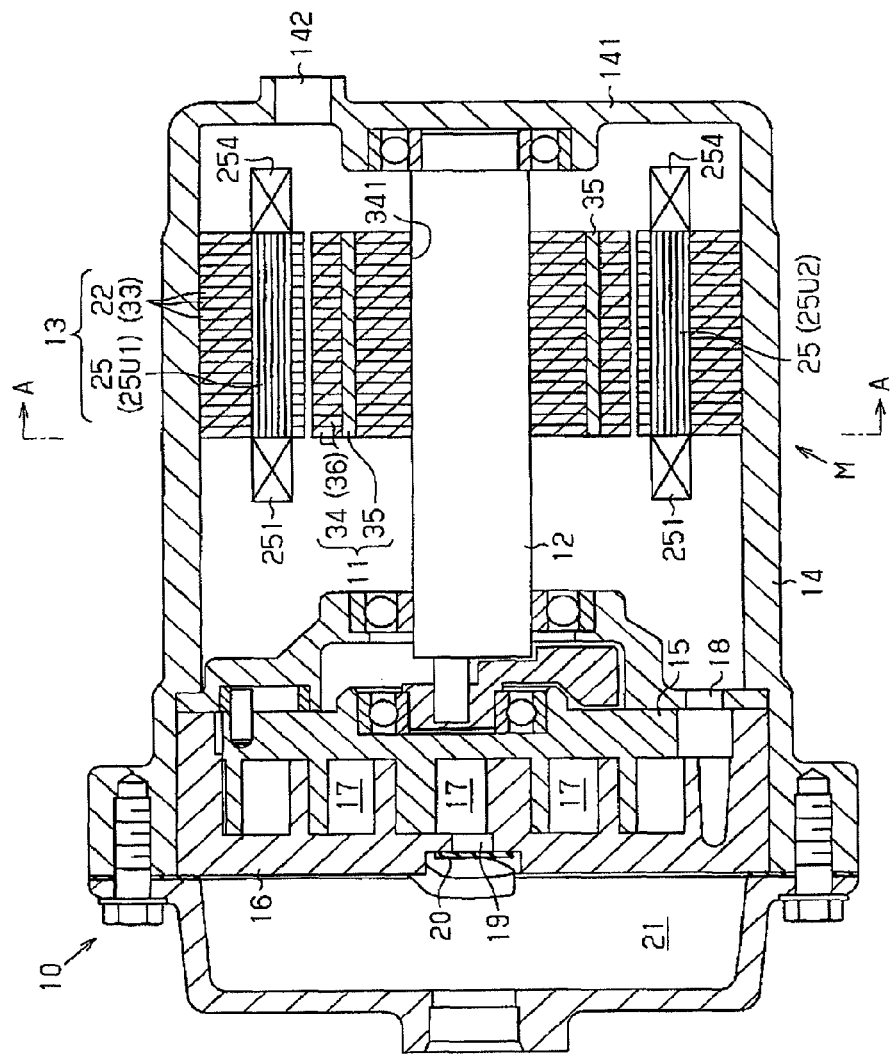
FIG. 1 is a longitudinal cross sectional view of a motor-driven compressor according to an embodiment of the present invention.

The following will describe the motor stator and the phase coil preform used for a motor-driven compressor according to the embodiment of the present invention with reference to FIGS. 1 through 5. Referring to FIG. 1, the motor-driven compressor is designated generally by reference numeral 10. The motor-driven compressor 10 includes an electric motor M formed by a rotor 11, a rotating shaft 12, a stator 13 and a motor housing 14. The rotor 11 is supported by the rotating shaft 12 and the stator 13 is fixed to the inner peripheral surface of the motor housing 14. A fixed scroll 16 fixedly mounted to the inner periphery of the motor housing 14 and a movable scroll 15 as a compressing member forming a part of the motor-driven compressor 10 is provided so as to make orbital motion with the rotation of the rotating shaft 12 and engaged with the fixed scroll 16, so that the volume of a compression chamber 17 formed between the movable scroll 15 and the fixed scroll 16 is reduced in accordance with the orbital motion of the movable scroll 15.

The motor housing 14 has an end wall 141 through which an inlet 142 is formed. The inlet 142 is connected to an external refrigerant circuit (not shown) and refrigerant gas in the external refrigerant circuit flows into the motor housing 14 through the inlet 142. Refrigerant gas thus introduced into the motor housing 14 is drawn into the compression chamber 17 through a passage 143 (shown in FIG. 2A) between inner peripheral surface of the motor housing 14 and outer peripheral surface of the stator 13 and also through a suction port 18. Refrigerant gas that is compressed in accordance with the orbital motion of the movable scroll 15 is discharged through a discharge port 19 into a discharge chamber 21 while pushing open a discharge valve 20. Then, refrigerant gas in the discharge chamber 21 flows out of the compressor 10 into the external refrigerant circuit and returns into the motor housing 14.

Figure 2A:
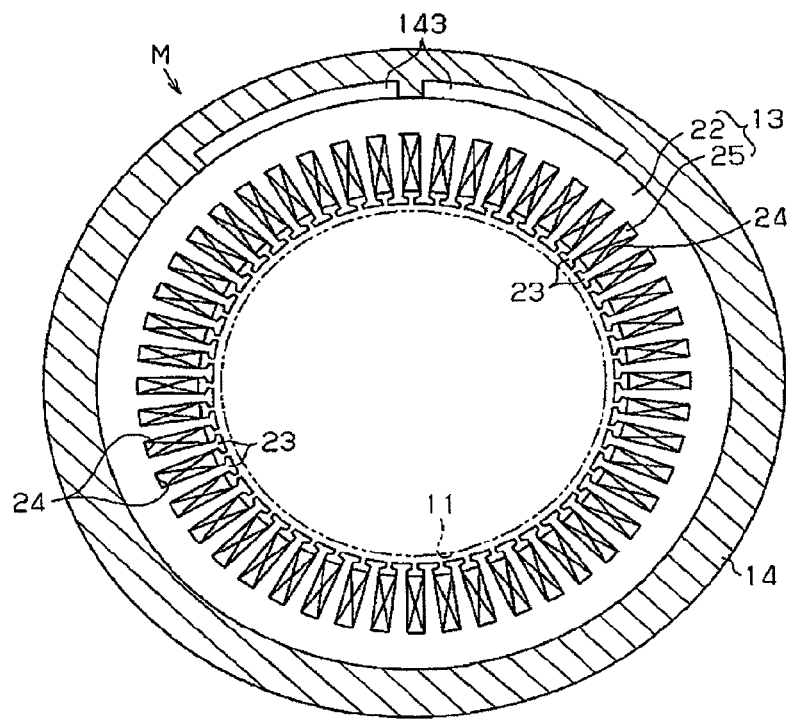
FIG. 2A is a cross sectional view taken along the line A-A of FIG. 1.

As shown in FIG. 2A, the stator 13 forming a part of the electric motor M includes an annular stator core 22 having formed in the inner periphery thereof a plurality of teeth 23 and a coil 25 that is provided in a plurality of slots 24 each formed between any two adjacent teeth 23. The electric motor M according to the embodiment is of a three-phase and eight-pole type and has 48 teeth 23 and slots 24, respectively. The coil 25 in the slots 24 is formed by wave winding.

As shown in FIG. 1, the stator core 22 is composed of a plurality of laminated core plates 33 made of a magnetic material (cupper plate). The rotor 11 forming a part of the electric motor M includes a rotor core 34 and a plurality of permanent magnets 35 embedded in the rotor core 34. The rotor core 34 is composed of a plurality of laminated core plates 36 made of a magnetic material (cupper plate). The rotor core 34 has formed through the center thereof a hole 341 through which the rotating shaft 12 is inserted and fixed to the rotor core 34.

Figure 2B:
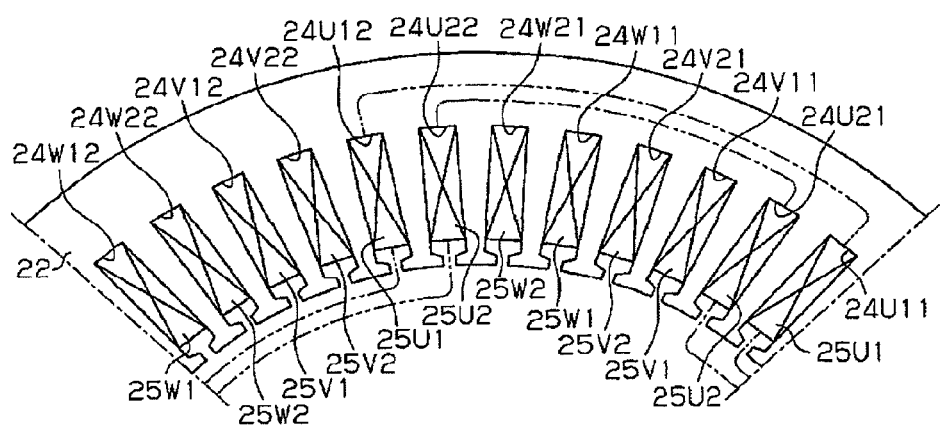
FIG. 2B is a partially enlarged view of FIG. 2A.

Referring to FIG. 2B showing a part of FIG. 2A, the coil 25 is formed of U-phase coils 25U1, 25U2, V-phase coils 25V1, 25V2 and W-phase coils 25W1, 25W2.

In FIG. 2B, the U-phase coils 25U1 and 25U2 are passed through separate slots 24U11, 24U12 and separate slots 24U21, 24U22, respectively. The U-phase coil 25U1 that is passed through the slots 24U11, 24U12 corresponds to the first wave winding bundle and the U-phase coil 25U2 that is passed through the slots 24U21, 24U22 corresponds to the second wave winding bundle.

In FIG. 2B, the V-phase coils 25V1 and 25V2 are passed through separate slots 24V11, 24V12 and separate slots 24V21, 24V22, respectively. The V-phase coil 25V1 that is passed through the slots 24V11, 24V12 corresponds to the first wave winding bundle and the V-phase coil 25V2 that is passed through the slots 24V21, 24V22 corresponds to the second wave winding bundle.

In FIG. 2B, the W-phase coils 25W1 and 25W2 are passed through separate slots 24W11, 24W12 and separate slots 24W21, 24W22, respectively. The W-phase coil 25W1 that is passed through the slots 24W11, 24W12 corresponds to the first wave winding bundle and the W-phase coil 25W2 that is passed through the slots 24W21, 24W22 corresponds to the second wave winding bundle.

The slot 24U21 is a first slot that is located adjacent to one side of a group of slots 24V11, 24V21, 24W11, 24W21. The slot 24U22 is a second slot that is located adjacent to the other side of the same group of slots 24V11, 24V21, 24W11, 24W21. That is, the U-phase coil 25U2 is passed through the first slot 24U21 and the second slot 24U22 that are located adjacent to respective sides of the above group of slots through which the phase coils other than the U-phase coil are passed.

The slot 24U11 is a third slot that is located adjacent to the first slot 24U21 (on the opposite side of the first slot 24U21 from the group of slots 24V11, 24V21, 24W11, 24W21). The slot 24U12 is a fourth slot that is located adjacent to the second slot 24U22 (on the opposite side of the second slot 24U22 from the group of slots 24V11, 24V21, 24W11, 24W21). That is, the U-phase coil 25U1 is passed through the third slot 24U11 that is adjacent to the first slot 24U21 and the fourth slot 24U12 that is adjacent to the second slot 24U22.

The slot 24V21 is a first slot that is located adjacent to one side of a group of slots 24U12, 24U22, 24W11, 24W21. The slot 24V22 is a second slot that is located adjacent to the other side of the same group of slots 24U12, 24U22, 24W11, 24W21. That is, the V-phase coil 25V2 is passed through the first slot 24V21 and the second slot 24V22 that are located adjacent to respective sides of the above group of slots through which the phase coils other than the V-phase coil are passed.

The slot 24V11 is a third slot that is located adjacent to the first slot 24V21 (on the opposite side of the first slot 24V21 from the group of slots 24U12, 24U22, 24W11, 24W21). The slot 24V12 is a fourth slot that is located adjacent to the second slot 24V22 (on the opposite side of the second slot 24V22 from the group of slots 24U12, 24U22, 24W11, 24W21). That is, the V-phase coil 25V1 is passed through the third slot 24V11 adjacent to the first slot 24V21 and the fourth slot 24V12 adjacent to the second slot 24V22.

The slot 24W21 is a first slot that is located adjacent to one side of a group of slots 24U12, 24U22, 24V12, 24V22. The slot 24W22 is a second slot that is located adjacent to the other side of the same group of slots 24U12, 24U22, 24V12, 24V22. That is, the W-phase coil 25W2 is passed through the first slot 24W21 and the second slot 24W22 that are located adjacent to respective sides of the above group of slots through which the phase coils other than the W-phase coil are passed.

The slot 24W11 is a third slot that is located adjacent to the first slot 24W21 (on the opposite side of the first slot 24W21 from the group of slots 24U12, 24U22, 24V12, 24V22). The slot 24W12 is a fourth slot that is located adjacent to the second slot 24W22 (on the opposite side of the second slot 24W22 from the group of slots 24U12, 24U22, 24V12, 24V22). That is, the W-phase coil 25W1 is passed through the third slot 24W11 adjacent to the first slot 24W21 and the fourth slot 24W12 adjacent to the second slot 24W22.

Figure 3:
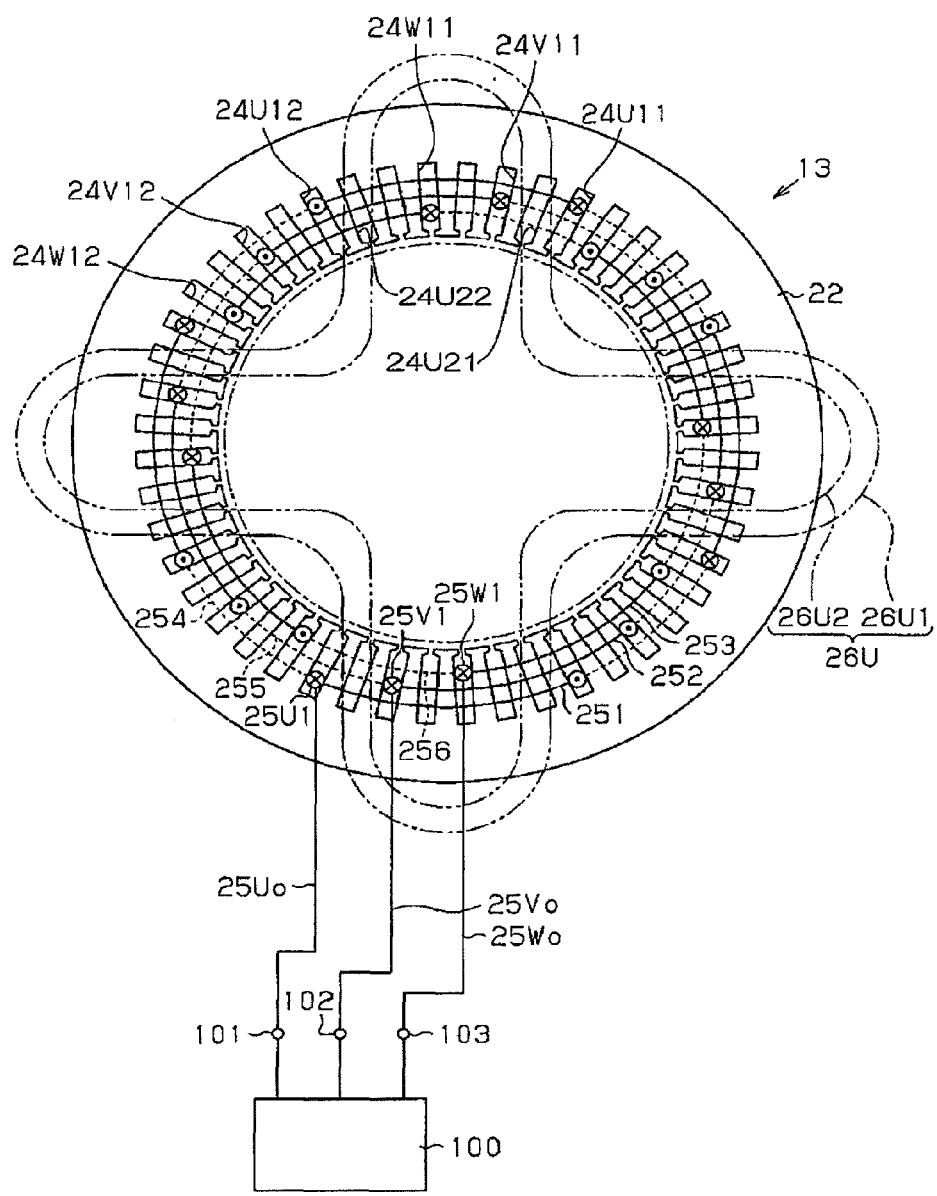
FIG. 3 is a schematic view describing a manner of wave winding.
Figure 4:
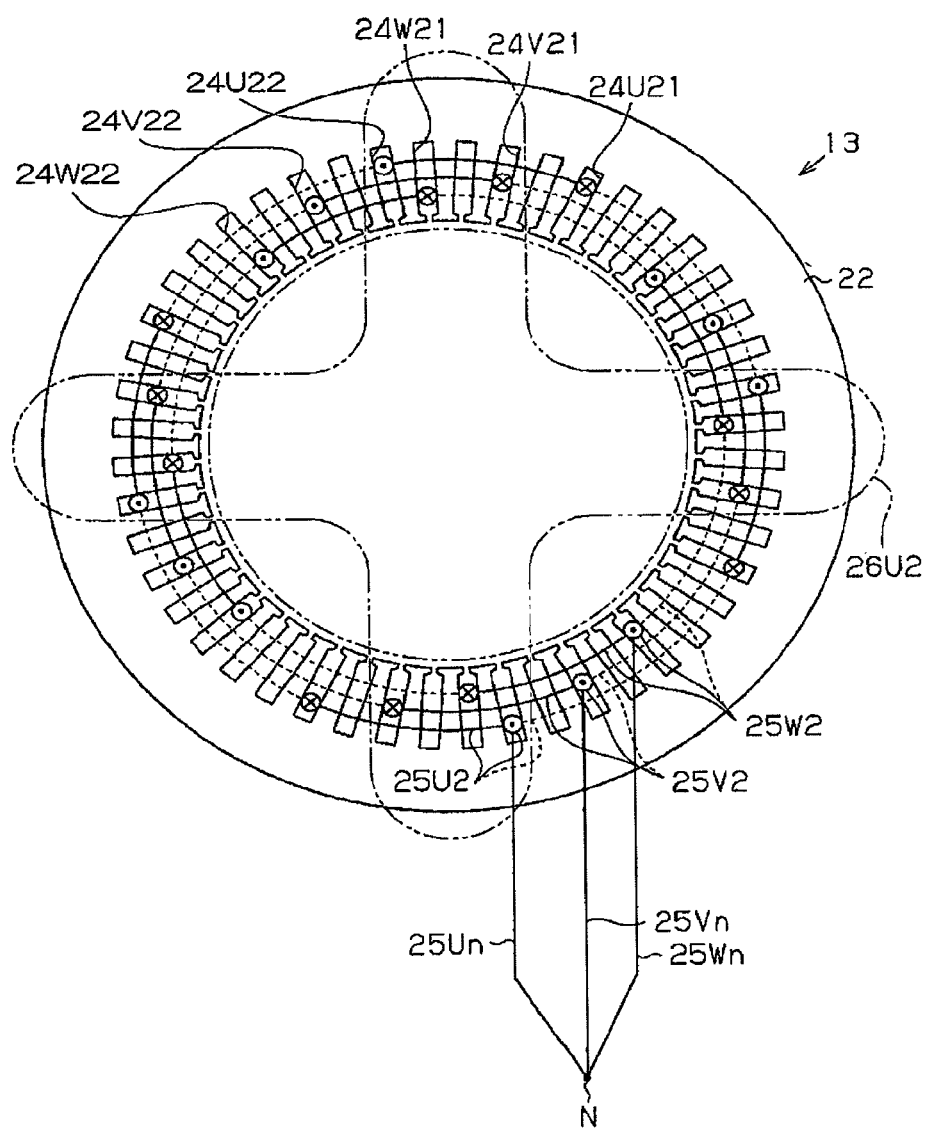
FIG. 4 is a schematic view also describing a manner of wave winding.

FIGS. 3 and 4 are the schematic views describing a manner of wave winding. As shown in FIG. 3, a lead wire 25U0 of the U-phase coil 25U1 is connected to a U-phase terminal 101 of an inverter 100. A lead wire 25V0 of the V-phase coil 25V1 is connected to a V-phase terminal 102 of the inverter 100. A lead wire 25W0 of the W-phase coil 25W1 is connected to a W-phase terminal 103 of the inverter 100. Solid lines 251, 252, 253 (shown in FIG. 3) of the respective phase-coils 25U1, 25V1, 25W1 show coil ends on the end surface of the stator 13 on the viewer's side of the drawing (coil end 251 is shown in FIG. 1). Dashed lines 254, 255, 256 (shown in FIG. 3) of the respective phase-coils 25U1, 25V1, 25W1 show coil ends on the end surface of the stator 13 on the opposite side of the drawing (coil end 254 is shown in FIG. 1). Parts of the coils connecting between the solid line and the dashed line of the respective phase-coils 25U1, 25V1, 25W1 are passed through the slots 24U11 and 24U12, 24V11 and 24V12, 24W11 and 24W12, respectively.

As shown in FIG. 4, the lead wires 25Un, 25Vn, 25Wn of the respective U-phase coil 25U2, the V-phase coil 25V2, the W-phase coil 25W2 are connected together at a neutral point N. Solid lines (shown in FIG. 4) of the respective coils 25U2, 25V2, 25W2 show coil ends on the end surface of the stator 13 on the viewer's side of the drawing. Dashed lines (shown in FIG. 4) of the respective coils 25U2, 25V2, 25W2 show coil ends on the end surface of the stator 13 on the opposite side of the drawing. Parts of the coils connecting between the solid lines and the dashed lines of the respective phase-coils 25U2, 25V2, 25W2 are passed through the slots 24U21 and 24U22, 24V21 and 24V22, 24W21 and 24W22, respectively.

Figure 5:
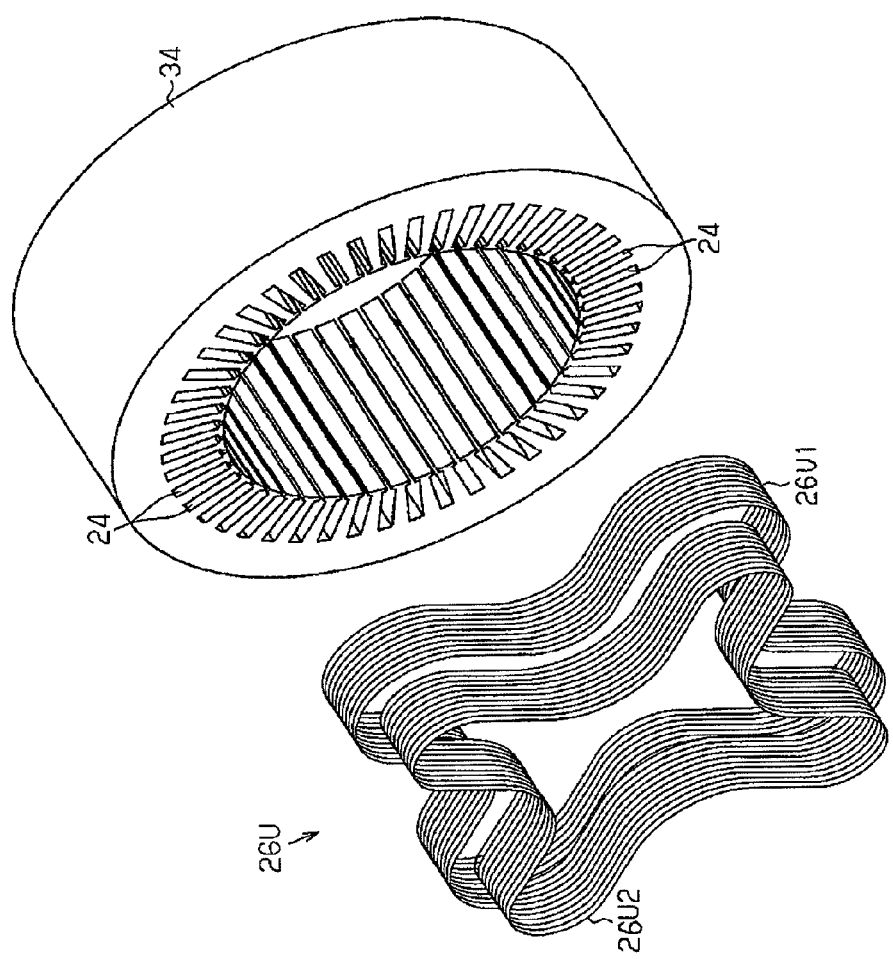
FIG. 5 is a perspective view describing a manner of inserting a phase coil preform into slots.

FIG. 5 is a perspective view describing a manner of inserting a U-phase coil preform 26U into slots 24U11, 24U12, 24U21, 24U22 (FIGS. 3, 4) by an inserter (not shown). The U-phase coil preform 26U is made of a single continuous wire 26L having no connection.

As indicated by imaginary lines (chain double-dashed lines) in FIG. 3, the U-phase coil preform 26U includes a first wave winding bundle preform 26U1 and a second wave winding bundle preform 26U2. The first wave winding bundle preform 26U1 is passed through the slots 24U11, 24U12 and forms the U-phase coil (first wave winding bundle) 25U1.

Similarly, the second wave Winding bundle preform 26U2 is passed through the slots 24U21, 24U22 and forms the U-phase coil (second wave winding bundle) 25U2.

After the U-phase coil preform 26U has been inserted into the slots 24U11, 24U12, 24U21, 24U22 2, the V-phase coil preform (not shown) is inserted into the slots 24V11, 24V12, 24V21, 24V22 by the inserter and subsequently the W-phase coil preform (not shown) is inserted into the slots 24W11, 24W12, 24W21, 24W22 by the inserter. Each phase coil perform including the first and the second wave winding bundle preforms is inserted into the slots in a longitudinal direction of the slots from outside of one side of the stator core 2.

Like the U-phase coil preform 26U, the V-phase coil preform and the W-phase coil preform include the first wave winding bundle preform and the second wave winding bundle preform, respectively.

The following will describe a method of forming a phase coil preform, taking the U-phase coil preform as an example.

Figure 6A:
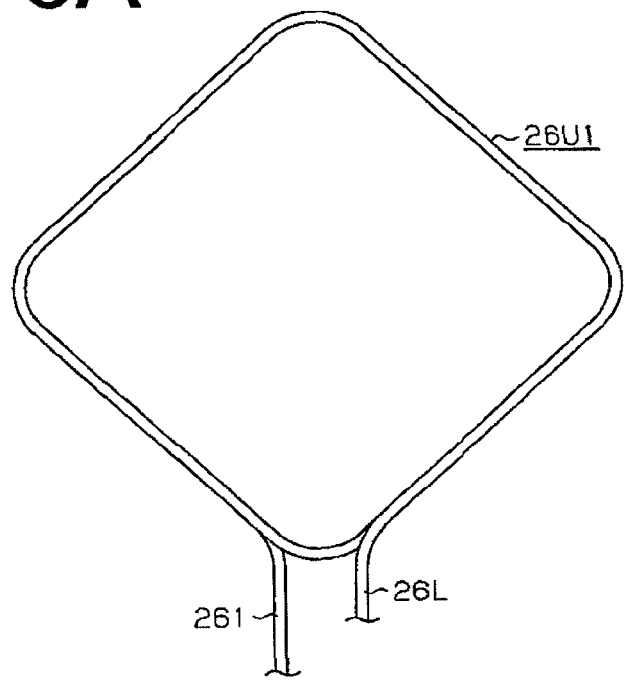
FIG. 6A is a schematic view showing a first wave winding bundle preform.
Figure 6B:
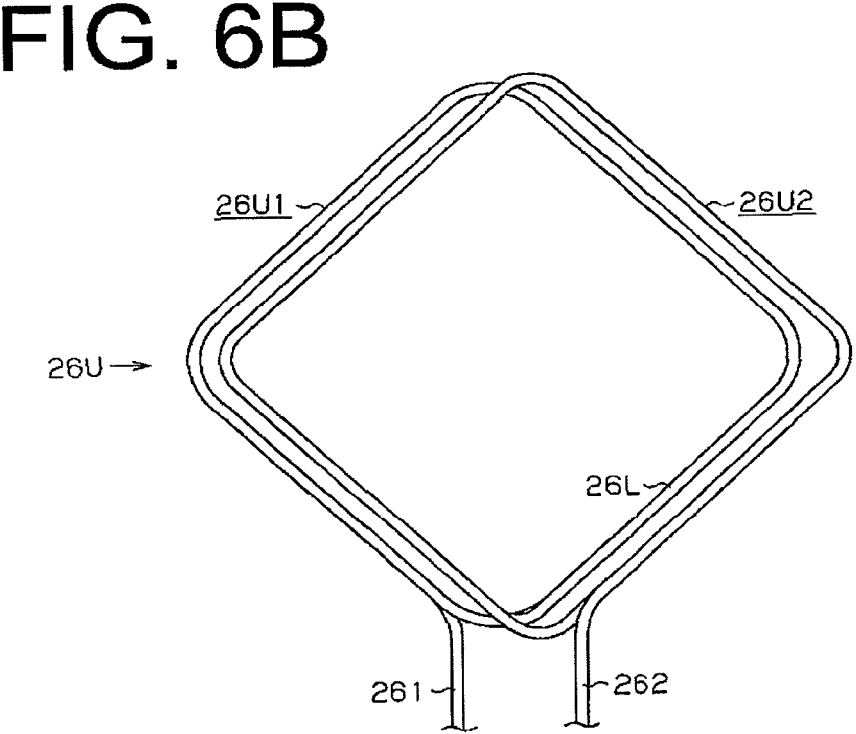
FIG. 6B is a schematic view showing the first wave winding bundle preform of FIG. 6A and a second wave winding bundle preform.

Firstly, the first wave winding bundle preform 26U1 is formed by winding a wire 26L for a plurality of turns, as shown in FIG. 6A, and then the second wave winding bundle preform 26U2 is formed by winding the rest of the wire 26L for the same number of turns as in the case of the first wave winding bundle preform 26U1.

Figure 7:
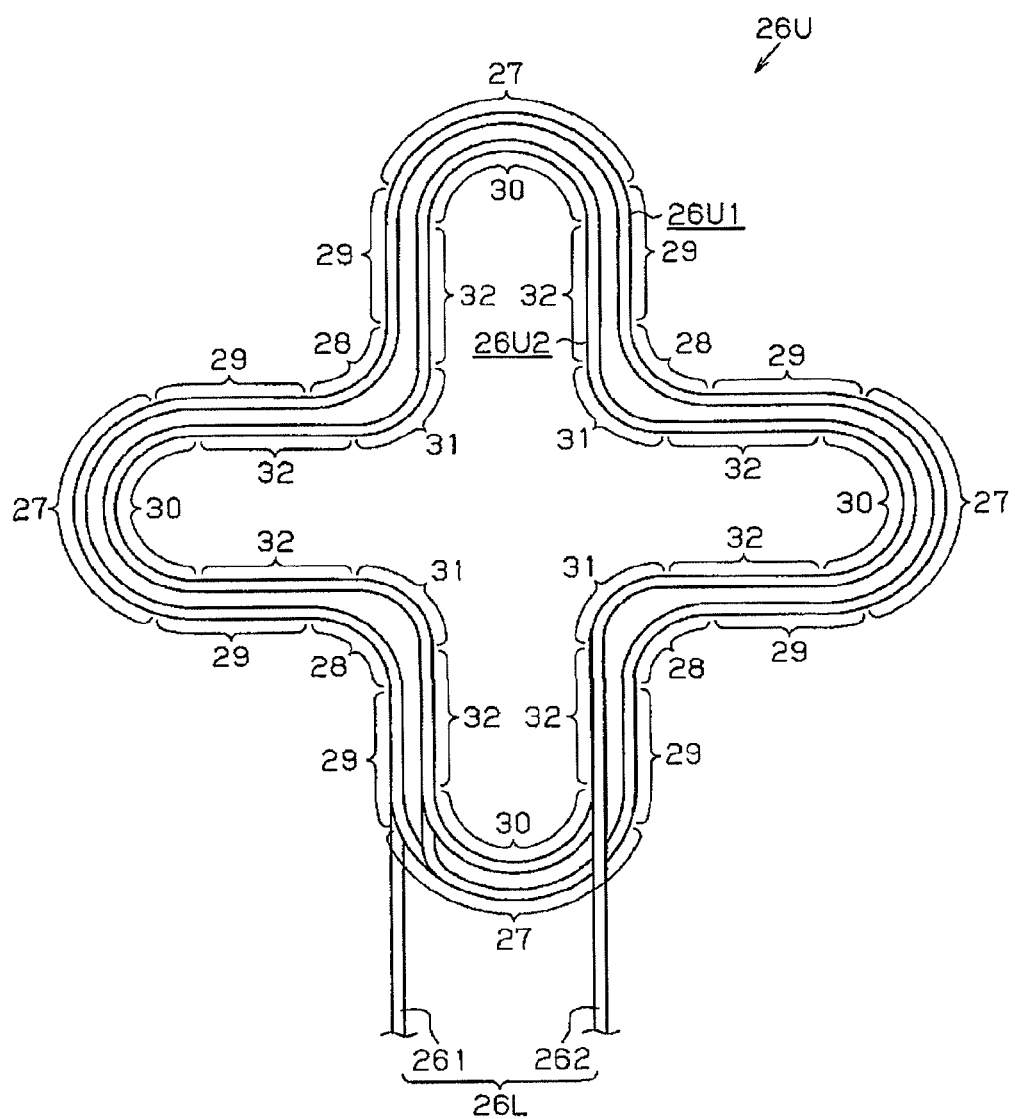
FIG. 7 is a schematic view showing a phase coil preform.

Then the first and the second wave winding bundle preforms 26U1, 26U2 are annularly-shaped as shown in FIG. 7, thereby forming the U-phase coil preform 26U. As shown in FIG. 7, the annular second wave winding bundle preform 26U2 is arranged inward of the annular first wave winding bundle preform 26U1. The length of one turn of the first wave winding bundle preform 26U1 is substantially the same as that of the second wave winding bundle preform 26U2.

As shown in FIG. 7, the first wave winding bundle preform 26U1 is of an annular shape having a first convex portion 27 and a first concave portion 28 arranged alternately. The first convex portion 27 is convexed in a radial direction of the first wave winding bundle preform 26U1 and the first concave portion 28 is concaved in a radial direction of the first wave winding bundle preform 26U1. The first wave winding bundle preform 26U1 has between any first convex portion 27 thereof and its adjacent first concave portion 28 a first slot passing portion 29 that is to be passed through the slots 24U11, 24U12.

Any two adjacent first slot passing portions 29 on opposite sides of the first convex portion 27 are arranged in parallel to each other. The spaced distance between the two adjacent first slot passing portions 29 is set so as to correspond to a distance between the slot 24U11 adjacent to the slot 24U21 and the slot 24U12 adjacent to the slot 24U22.

The second wave winding bundle preform 26U2 is of an annular shape having a convex portion 30 and a concave portion 31 arranged alternately. The second convex portion 30 is convexed in a radial direction of the second wave winding bundle preform 26U2 and the second concave portion 31 is concaved in a radial direction of the second wave winding bundle preform 26U2. The second wave winding bundle preform 26U2 has the same numbers of the second convex portions 30 and the second concave portions 31 as the first convex portions 27 and the first concave portions 28, respectively.

The second wave winding bundle preform 26U2 has between any second convex portion 30 thereof and its adjacent second concave portion 31 a second slot passing portion 32 that is to be passed through the slots 24U21, 24U22. The second slot passing portion 32 is located inward of the first slot passing portion 29 (inward of the first wave winding bundle preform 26U1). The second wave winding bundle preform 26U2 has the same number of the second slot passing portions 32 as the first slot passing portions 29.

Any two adjacent second slot passing portions 32 on opposite sides of the second convex portion 30 are arranged in parallel to each other. The spaced distance between the two adjacent second slot passing portions 32 is set so as to correspond to a distance between the slots 24U21, 24U22 located adjacent to the opposite sides of the group of slots 24V11, 24V21, 24W11, 24W21.

One end 261 of the continuous wire 26L is led from one of the first convex portions 27 of the first wave winding bundle preform 26U1 and the other end 262 is led from one of the second convex portions 30 of the second wave winding bundle preform 26U2 located inward of the first convex portion 27. The end 261 forms a lead wire 25U0 (FIG. 3) of the U-phase coil 25U1 and the other end 262 forms a lead wire 25Un (FIG. 4) of the U-phase coil 25U2.

The embodiment according to the present invention offers the following advantageous effects.

(1) The first and the second wave winding bundle preforms 26U1, 26U2 are made of a single continuous wire 26L having no connection. Therefore, a process of connecting the coils need not be performed and thus a stator having an increased number of slots can be manufactured easily.

(2) Since refrigerant circulates inside the motor housing 14 of the motor-driven compressor 10 according to the embodiment, it is important for the motor-driven compressor 10 to ensure insulation of the coil 25. If the first wave winding bundle 25U1 and the second wave winding bundle 25U2 are electrically connected in the fabrication process, the connection between the bundles 25U1 and 25U2 must be covered with insulating material to ensure the insulation. In the structure according to the embodiment of the present invention wherein the first wave winding bundle 25U1 and the second wave winding bundle 25U2 need not be connected electrically, however, any process for providing insulation for the coil need not be performed and, therefore, stator having many slots can be manufactured easily.

(3) The number of winding turns for the first wave winding bundle preform 26U1 is the same as that for the second wave winding bundle preform 26U2. One end 261 of the continuous wire 26L is led from one of the first convex portions 27 and the other end 262 of the same wire 26L is led from one of the second convex portions 30 located inward of the first convex portions 27. Thus, the numbers of wires passing through the respective slot 24 are the same and, therefore, the torque at any arbitrary angular position of the rotor 11 is the same under the condition where the electric current supplied to the coil 25 is constant.

The present invention can be modified in various ways as exemplified below.

The first wave winding bundle may be formed after the second wave winding bundle has been formed.

Any two adjacent first slot passing portions on opposite sides of the first convex portion may be arranged in any way other than being parallel to each other.

Any two adjacent second slot passing portions on opposite sides of the second convex portion may be arranged in any way other than being parallel to each other.

The present invention may be applied to an electric motor (outer rotor type) having a stator around which a rotor rotates.

The phase coil may include three or more wave winding bundles. That is, another wave winding bundle may be arranged on the opposite side of the first wave winding bundle from the second wave winding bundle.

The present invention may be applied to any other type of motor-driven compressor than the scroll type compressor (e.g. a piston type compressor).

What is claimed is:

1. A stator of a motor comprising:
    a stator core having a plurality of teeth forming slots between any two adjacent teeth:
    a plurality of phase coils provided in the slots, each formed by wave winding and made of a continuous wire, wherein each phase coil including:
    a first wave winding bundle; and
    a second wave winding bundle that is passed through a first slot and a second slot, wherein the first slot is located adjacent to one side of a group of slots through which the phase coils other than said each phase coil are passed through and the second slot is located adjacent to the other side of the group of slots, wherein the first wave winding bundle is passed through a third slot and a fourth slot, wherein the third slot is located adjacent to the first slot on the opposite side of the first slot from the group of slots and the fourth slot is located adjacent to the second slot on the opposite side of the second slot from the group of slots.

2. The stator of the motor according to claim 1, wherein the phase coil is made of a phase coil preform that is passed through the first through the fourth slots, wherein the phase coil preform including:
    a first wave winding bundle preform passed through the third slot and the fourth slot and forming the first wave winding bundle; and
    a second wave winding bundle preform passed through the first slot and the second slot and forming the second wave winding bundle.

3. The stator of the motor according to claim 2, wherein the phase coil is formed by inserting the first and the second wave winding bundle preforms into the slot in a longitudinal direction of the slot from outside of one side of the stator core.

4. The stator of the motor according to claim 1, wherein the first wave winding bundle preform comprising:
    a plurality of first convex portions, the respective first convex portion being convexed in a radial direction of the first wave winding bundle preform;
    a plurality of first concave portions, the respective first concave portion being concaved in a radial direction of the first wave winding bundle preform; and
    a plurality of first slot passing portions provided between any first convex portion and its adjacent first concave portion; wherein the first phase coil preform is of an annular shape having the first convex portion and the first concave portion arranged alternately, wherein the second phase coil preform comprising:
    the same number of second convex portions as the first convex portions, the respective second convex portion being convexed in a radial direction of the second wave winding bundle preform;
    the same number of second concave portions as the first concave portions, the respective second concave portion being concaved in a radial direction of the second wave winding bundle preform; and
    the same number of second slot passing portions as the first slot passing portions provided between any second convex portion and its adjacent second concave portion; wherein the second phase coil preform is of an annular shape having the second convex portion and the second concave portion arranged alternately, wherein the second slot passing portion is located inward of the first slot passing portion.

5. The stator of the motor according to claim 4, wherein the first slot passing portion of the first wave winding bundle preform is passed through the third slot and the fourth slot, wherein the second slot passing portion of the second wave winding bundle preform is passed through the first slot and the second slot.

6. The stator of the motor according to claim 4, wherein one end of the phase coil preform is led from one of the first convex portions and the other end is led from one of the second convex portions located inward of the first convex portion.

7. The stator of the motor according to claim 4, wherein the adjacent first slot passing portions on opposite sides of the first convex portion are arranged in parallel to each other and the spaced distance between the two adjacent first slot passing portions corresponds to a distance between the third slot and the fourth slot, wherein the adjacent second slot passing portions on opposite sides of the second convex portion are arranged in parallel to each other and the spaced distance between the two adjacent second slot passing portions corresponds to a distance between the first slot and the second slot.

8. The stator of the motor according to claim 2, wherein the number of winding turns for the first wave winding bundle preform is the same as that for the second wave winding bundle preform.

9. The stator of the motor according to claim 1, wherein the second wave winding bundle of the phase coil is located inward of the first wave winding bundle.

10. A phase coil preform used for a stator of a motor, wherein the stator of the motor has a stator core having a plurality of teeth forming slots between any two adjacent teeth, wherein a plurality of phase coils formed by wave winding are provided in the slots, wherein the phase coil preform forming the phase coil is made of a continuous wire, wherein
    the phase coil preform comprising:
        a first wave winding bundle preform, wherein the first wave winding bundle preform including:
            a plurality of first convex portions, the respective first convex portion being convexed in a radial direction of the first wave winding bundle preform;
            a plurality of first concave portions, the respective first concave portion being concaved in a radial direction of the first wave winding bundle preform; and
            a plurality of first slot passing portions provided between any first convex portion and its adjacent first concave portion; wherein the first phase coil preform is of an annular shape having the first convex portion and the first concave portion arranged alternately, and
        a second wave winding bundle preform, wherein the second wave winding bundle preform including:
            the same number of second convex portions as the first convex portions, the respective second convex portion being convexed in a radial direction of the second wave winding bundle preform;
            the same number of second concave portions as the first concave portions, the respective second concave portion being concaved in a radial direction of the second wave winding bundle preform; and
            the same number of second slot passing portions as the first slot passing portions provided between any second convex portion and its adjacent second concave portion; wherein the second phase coil preform is of an annular shape having the second convex portion and the second concave portion arranged alternately, wherein the second slot passing portion is located inward of the first slot passing portion.

* * * * *